Feb. 25, 1941.      K. M. HAZELROTH      2,233,313
BICYCLE SHOCK ABSORBER
Filed Dec. 12, 1939

Kenneth M. Hazelroth
INVENTOR

BY Victor J. Evans & Co.
ATTORNEYS

Patented Feb. 25, 1941

2,233,313

UNITED STATES PATENT OFFICE 2,233,313

BICYCLE SHOCK ABSORBER

Kenneth M. Hazelroth, Clark Fork, Idaho

Application December 12, 1939, Serial No. 308,852

2 Claims. (Cl. 280—276)

This invention relates to a bicycle shock absorber and has for an object to provide a compact neat and shock efficient absorbing device housed in the steering head and adapted to absorb road shocks and other shocks transmitted from the front wheel of the bicycle.

Other objects are to provide a shock absorbing unit which will be sealed in the head from dust and other abrasive matter, which will have a two-part steering shaft rotatable as a unit and telescopically assembled, which will have cushioned stops to limit travel of the moving parts and to absorb shocks.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1:
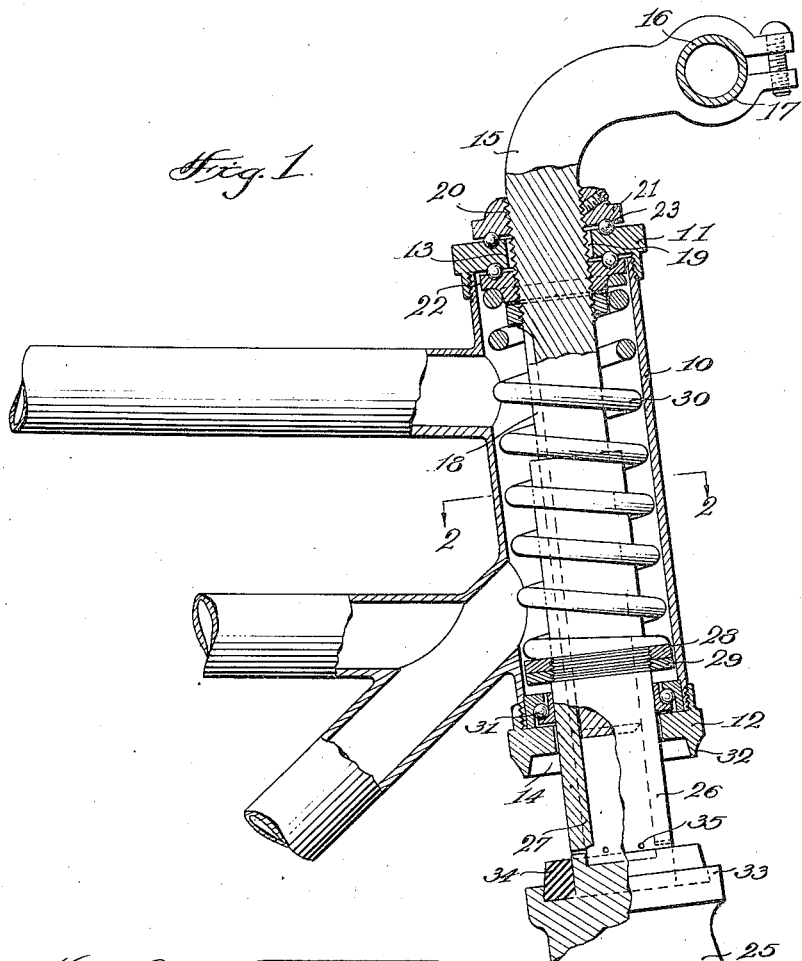
Figure 1 is a fragmentary longitudinal sectional view of the steering head of a bicycle, constructed in accordance with the invention.
Figure 2:
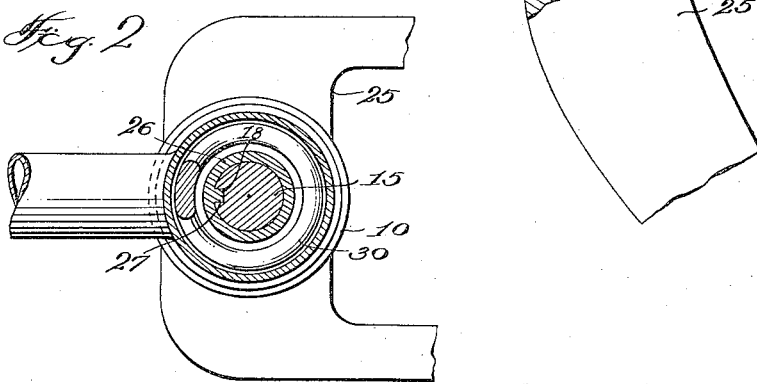
Figure 2 is a cross sectional view taken on the line 2—2 of Figure 1.

Referring now to the drawing in which like characters of reference designate similar parts in the various views, 10 designates the tubular head of a bicycle frame, closed at the upper and lower ends by caps 11 and 12 having central openings 13 and 14. A two-part steering shaft is housed by the head, and comprises an upper shaft 15 which extends through the opening 13 of the upper cap and is provided with a split ring clamp 16 for securing the handle bar 17 to the shaft. The shaft is provided with a longitudinal groove 18 within the head 10. A bushing 19 is journaled in the opening 13 of the upper cap and is provided with internal threads to engage with the threaded portion 20 of the shaft 15. Lock nuts 21 and 22 are disposed on opposite sides of the cap 11 and may be adjusted on the threaded portion of the shaft to confine ball bearings 23 against the upper and lower faces of the cap 11 and promote anti-friction turning of the shaft.

A fork 25, for carrying the front wheel of the bicycle, is provided with a tubular stem 26 which telescopically receives the shaft 15 within the head 10. A spline 27 projects from the tubular stem into the groove 18 to restrain the shaft and stem to telescopic endwise movement and prevent relative axial rotary movement of the parts.

A spring supporting washer 28, having a resilient bottom facing 29 is threaded onto a threaded portion of the tubular stem 26 and is adapted to support a helical spring 30 within the head 10. The upper end of the spring engages the lock nut 22 and the spring tends constantly to force the head 10 upwardly and the fork 25 downwardly.

Ball bearings 31 are disposed on the tubular stem 26 between the lower cap 12 and the inner surface of the head to promote anti-friction turning movement of the tubular stem 26.

The cap 12 is provided with a depending peripheral flange 32 and the fork 25 is provided with an upstanding flange 33. A cushion ring 34, of rubber or other resilient material, is retained in the flange 33. During vertical movement of the fork tending to impinge the flange 33 against the flange 32, the cushion ring 34 will be compressed within the flange 32 and absorb shock as well as prevent engagement and possible breakage of the flanges 32 and 33.

In operation the head 10 locks the shaft 15 from vertical relative movement through the medium of the lock nuts 21 and 22. When the handle bar 17 is turned rotary movement is transmitted to the stem 26 through the spline 27. When the bicycle wheel carried by the fork encounters obstructions and uneven surfaces, the tubular stem 26 moves endwise upwardly relatively to the shaft 15 against the tension of the heavy shock absorbing spring 30, which latter absorbs the shocks.

By referring to Figure 1 it will be seen that a plurality of air vents 35 are formed in the tubular stem 26 to vent the air within the tubular stem 26 to the atmosphere, slowly, when the shaft and stem move endwise relatively to each other to assist the spring 30 in absorbing road shocks.

From the above description it is though that the construction and operation of the invention will be fully understood without further explanation.

What is claimed is:

1. A shock absorber for bicycles or the like comprising, a tubular head, a steering shaft extending into one end of the head, means preventing endwise movement of the shaft within the head but permitting rotation therein, a bearing mounted on the remote end of the head from said means, a steering fork including a tubular stem open at its free end and having restricted transverse ports adjacent the fork, said stem being passed through said bearing and alined with and receiving the shaft within its open end, said stem being longitudinally movable relative to the shaft in telescoping action thereon, whereby an air cushion is provided for creating a cushion and a check to retard the telescopic reciprocatory action of the shaft and stem by alternately discharging and receiving air through the restricted ports, and a spring means surrounding and normally extending the telescoping elements.

2. A shock absorber for bicycles or the like comprising, a steering head, a steering shaft received into the upper end of the head and terminating at the lower end of the head, a bearing mounted on the upper end of the head locking the shaft from longitudinal motion but permitting rotary motion of the shaft within the head, a steering fork having a tubular stem open at its upper end but closed at its lower end and provided with restricted ports adjacent its closed end, said stem receiving the shaft with provision for relative longitudinal motion independently of the stem but the shaft and stem being rotatable by and with each other as a unit, whereby an air cushion is created within the base portion of the stem upon longitudinal motion of the stem in one direction on the shaft with retarded egress and upon movement of the stem in the reverse longitudinal direction creating a vacuum and sucking in air through said restricted ports in retardation of such reverse movement, a spring seat mounted on said stem intermediate of the length thereof, and a helical spring surrounding the stem and shaft interposed between said spring seat and said upper bearing and urging tension of the stem on the shaft.

KENNETH M. HAZELROTH.